United States Patent
Li et al.

(10) Patent No.: US 11,792,100 B2
(45) Date of Patent: Oct. 17, 2023

(54) NETWORK PERFORMANCE PARAMETER SENDING METHOD, NETWORK PERFORMANCE CALCULATION METHOD, AND NETWORK NODE

(71) Applicant: Huawei Technologies Co., Ltd., Shenzhen (CN)

(72) Inventors: Cheng Li, Beijing (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 115 days.

(21) Appl. No.: 17/135,317

(22) Filed: Dec. 28, 2020

(65) Prior Publication Data

US 2021/0119895 A1   Apr. 22, 2021

Related U.S. Application Data

(63) Continuation of application No. PCT/CN2019/092493, filed on Jun. 24, 2019.

(30) Foreign Application Priority Data

Jun. 25, 2018   (CN) .......................... 201810660237.0

(51) Int. Cl.
*H04L 43/0852* (2022.01)
*H04L 43/18* (2022.01)
(Continued)

(52) U.S. Cl.
CPC .......... *H04L 43/0858* (2013.01); *H04L 43/18* (2013.01); *H04L 45/741* (2013.01); *H04L 45/745* (2013.01)

(58) Field of Classification Search
CPC ... H04L 43/0858; H04L 43/18; H04L 45/741; H04L 45/745; H04L 43/08;
(Continued)

(56) References Cited

U.S. PATENT DOCUMENTS 7,440,087 B2    10/2008   Froggatt et al.
10,516,610 B2 *  12/2019   Filsfils ................... H04L 45/74
(Continued)

FOREIGN PATENT DOCUMENTS

CN    1881908 A      12/2006
CN    101056215 A    10/2007
(Continued)

OTHER PUBLICATIONS

Gen, L., et al., "Software defined content centric network's segment routing strategy," Application Research of Computers, vol. 35, No. 7, Jul. 2018, 5 pages.
(Continued)

*Primary Examiner* — Kibrom T Hailu
(74) *Attorney, Agent, or Firm* — Conley Rose, P.C.

(57) ABSTRACT

A network performance parameter sending method includes: obtaining, by a first network node, a segment identifier of a second network node in a segment list of a packet, where the second network node is a next-hop segment node of the first network node on a forwarding path of the packet; and adding, by the first network node, a network performance parameter of the first network node to the segment list, and then sending the packet to the second network node. In a process of forwarding the packet by using the segment list in the packet, the first network node uses the segment list to carry the network performance parameter of the network node.

20 Claims, 8 Drawing Sheets

(51) Int. Cl.
*H04L 45/741* (2022.01)
*H04L 45/745* (2022.01)

(58) Field of Classification Search
CPC ..... H04L 43/0876; H04L 43/20; H04L 47/28; H04L 47/30; H04L 45/34; H04L 43/0835; H04L 45/50; H04L 45/74
See application file for complete search history.

(56) References Cited

U.S. PATENT DOCUMENTS

| | | | |
|---|---|---|---|
| 11,570,285 B2 | 1/2023 | Li et al. | |
| 2007/0242620 A1 | 10/2007 | Zhai | |
| 2014/0269266 A1 | 9/2014 | Filsfils et al. | |
| 2014/0317259 A1 | 10/2014 | Previdi et al. | |
| 2014/0369356 A1* | 12/2014 | Bryant | H04L 45/745 370/392 |
| 2015/0139024 A1 | 5/2015 | Kaplan et al. | |
| 2015/0188804 A1 | 7/2015 | Ashwood-Smith | |
| 2015/0256456 A1 | 9/2015 | Previdi et al. | |
| 2015/0358221 A1 | 12/2015 | Guo et al. | |
| 2016/0191400 A1* | 6/2016 | Sreeramoju | H04L 47/34 370/474 |
| 2016/0294702 A1 | 10/2016 | Kodialam et al. | |
| 2017/0250908 A1 | 8/2017 | Nainar et al. | |
| 2017/0339072 A1 | 11/2017 | Pignataro et al. | |
| 2017/0373966 A1 | 12/2017 | Liao et al. | |
| 2018/0019944 A1 | 1/2018 | Peng et al. | |
| 2018/0034712 A1 | 2/2018 | Nainar et al. | |
| 2018/0034727 A1 | 2/2018 | Nainar et al. | |
| 2018/0152369 A1* | 5/2018 | McCallen | H04L 43/0829 |
| 2019/0020563 A1 | 1/2019 | Meilik | |
| 2019/0036818 A1 | 1/2019 | Nainar et al. | |
| 2019/0104058 A1 | 4/2019 | Filsfils et al. | |
| 2019/0288941 A1 | 9/2019 | Filsfils et al. | |
| 2020/0076727 A1* | 3/2020 | Filsfils | H04L 45/34 |
| 2020/0084147 A1 | 3/2020 | Gandhi et al. | |
| 2020/0274798 A1 | 8/2020 | Filsfils et al. | |
| 2020/0328971 A1* | 10/2020 | Bashandy | H04L 49/35 |
| 2020/0329129 A1 | 10/2020 | Li et al. | |
| 2021/0119895 A1 | 4/2021 | Li et al. | |

FOREIGN PATENT DOCUMENTS

| | | |
|---|---|---|
| CN | 102035691 A | 4/2011 |
| CN | 102273136 B | 12/2012 |
| CN | 105282028 A | 1/2016 |
| CN | 105871721 A | 8/2016 |
| CN | 105871722 A | 8/2016 |
| CN | 105874752 A | 8/2016 |
| CN | 106657035 A | 5/2017 |
| CN | 107171882 A | 9/2017 |
| CN | 107548545 A | 1/2018 |
| CN | 107689915 A | 2/2018 |
| CN | 109981457 A | 7/2019 |
| EP | 1855416 A1 | 11/2007 |
| EP | 3154227 A1 | 4/2017 |

OTHER PUBLICATIONS

Previdi, S., et al, "IS-IS Extensions for Segment Routing," draft-ietf-isis-segment-routing-extensions-16, Apr. 19, 2018, 35 pages.

Filsfils, C., et al, "SRv6 Network Programming," draft-filsfils-spring-srv6-network-programming-04, Mar. 4, 2018, 57 pages.

Fioccola, G., et al, "Alternate-Marking Method for Passive and Hybrid Performance Monitoring," Internet Engineering Task Force (IETF), RFC 8321, Jan. 2018, 33 pages.

Filsfils, C., et al., "SRv6 Network Programming," draft-filsfils-spring-srv6-network-programming-02, Oct. 30, 2017, 49 pages.

* cited by examiner

NETWORK PERFORMANCE PARAMETER SENDING METHOD, NETWORK PERFORMANCE CALCULATION METHOD, AND NETWORK NODE

CROSS-REFERENCE TO RELATED APPLICATIONS

This is a continuation of Int'l Patent App. No. PCT/CN2019/092493, filed on Jun. 24, 2019, which claims priority to Chinese Patent App. No. 201810660237.0, filed on Jun. 25, 2018, both of which are incorporated by reference.

FIELD

The present disclosure relates to the communications field, and in particular, to a network performance parameter sending method, a network performance calculation method, a network node, and a system.

BACKGROUND

When segment routing (SR) is deployed in Internet Protocol version 6 (IPv6), the segment routing is referred to as SRv6. To measure network performance of an SRv6 network, an extra in-situ operation, administration, and maintenance (IOAM) packet header needs to be added to a service packet, and the IOAM packet header is used to carry a network performance parameter of a node. However, in this solution, the extra packet header needs to be added to carry the network performance parameter of the node. This not only wastes a network resource, but also increases packet processing difficulty.

SUMMARY

This disclosure provides a network performance parameter sending method, a network performance calculation method, a network node, and a system, to provide the network performance parameter sending method and the network performance calculation method that save network resources.

According to a first aspect, an embodiment provides a network performance parameter sending method. The method includes: A first network node obtains a segment identifier of a second network node in a segment list of a first packet, where the second network node is a next-hop segment node of the first network node on a forwarding path of the first packet. The first network node adds a network performance parameter of the first network node to the segment list. The first network node sends, to the second network node, the first packet to which the network performance parameter of the first network node is added.

According to the method, in a process of forwarding the packet by using the segment list in the packet, the first network node uses the segment list to carry the network performance parameter of the network node, and no extra packet header is needed to carry the network performance parameter. This reduces a packet header length and saves a network resource. For example, this reduces a network bandwidth resource occupied in a packet sending process.

In a possible design, the first network node modifies one segment identifier in the segment list to add the network performance parameter of the first network node to the segment list. One existing segment identifier in the segment list is used to carry the network performance parameter, to reduce packet processing difficulty. For example, processing actions of generating and inserting the extra packet header does not need to be performed.

In a possible design, the first network node modifies one segment identifier in the segment list to add the network performance parameter to the 65th bit to the 128th bit of the segment identifier. In an SRv6 technology, the segment identifier includes a locator part. The locator occupies a part or all of the first bit to the 64th bit of the segment identifier, and the locator is used to route and forward or identify a network node. Optionally, another part other than the locator in the segment identifier may also be used to carry the network performance parameter.

In a possible design, that the first network node adds a network performance parameter of the first network node to the segment list includes: After the first network node obtains the segment identifier that is of the second network node and that is in the segment list of the first packet, the first network node modifies the segment identifier that is of the second network node and that is in the segment list to add the network performance parameter to the segment identifier that is of the second network node and that is in the segment list. In the SRv6 technology, the segment list is used to guide packet forwarding. Segment identifiers in the segment list in sequence specify an explicit forwarding path, and each segment identifier in the segment list corresponds to a network node. After the first network node sets a destination address (DA) of the packet to a segment identifier that is of the next-hop segment node of the first network node and that is in the segment list according to the segment list, the segment identifier of the next-hop segment node is not deleted from the segment list, and the segment identifier of the next-hop segment node is no longer used in a subsequent forwarding process. Therefore, after the first network node sets the DA of the packet to the segment identifier of the next-hop segment node, a function of the segment identifier that is of the next-hop segment node, that is in the segment list, and that is used for packet forwarding disappears, and the first network node may continue to use the segment identifier field that is of the next-hop segment node and that is in the segment list. The network performance parameter of the first network node is included in the segment identifier of the second network node, and no extra packet header is needed to carry the network performance parameter of the first network node. This saves a network resource.

In a possible design, the method further includes: The first network node determines the segment list based on a DA of a second packet and a packet forwarding policy. The packet forwarding policy includes a correspondence between the DA of the second packet and the segment list, and the second packet is a packet received by the first network node or a packet generated for the first network node. The first network node adds the segment list in the forwarding policy to the second packet to generate the first packet.

In a possible design, the network performance parameter includes one or more of the following: a time at which the first network node sends the first packet; a quantity of service packets that are sent by using the segment list and that are received by the first network node before the first network node sends the first packet; and a queue occupation rate of a packet sending queue of the first network node, where the packet sending queue is a first-in, first-out (FIFO) queue for storing the first packet.

In a possible design, the segment identifier of the second network node includes a network performance parameter type, and the network performance parameter of the first network node is a network performance parameter indicated by the network performance parameter type. Optionally, the network performance parameter type includes a time type, a type of a quantity of sent packets, and a queue occupation type. The network performance parameter type is included in the segment identifier, so that the network performance parameter can be sent on demand.

In a possible design, when the network performance parameter type is the time type, the first network node adds, to the segment list, the time at which the first network node sends the first packet. When the network parameter type is the type of the quantity of sent packets, the first network node adds, to the segment list, the quantity of service packets that are sent by using the segment list and that are received before the first network node sends the first packet. When the network parameter type is the queue occupation type, the first network node adds, to the segment list, the queue occupation rate of the packet sending queue for storing the first packet.

In a possible design, the network performance parameter includes interface information of an outbound interface used by the first network node to send the first packet, and the interface information may be an interface identifier. The network performance parameter includes the interface information of the outbound interface used to send the packet, to help a network management device or a controller in a network monitor a forwarding path of a network packet. This facilitates load sharing or forwarding path optimization of the network packet.

In a possible design, when the first network node is an ingress node that is used for forwarding the first packet and that is in an SRv6 network, the segment list may also include a segment identifier of the first network node. In this case, the network performance parameter of the first network node may be added to the segment identifier of the first network node. Optionally, the first network node modifies the segment identifier that is of the first network node and that is in the segment list to add the network performance parameter to the 65th bit to the 128th bit of the segment identifier of the first network node. In the SRv6 technology, when the ingress node in the SRv6 network uses the segment list to forward the packet, the segment list generally does not need to include a segment identifier of the ingress node. The packet may be forwarded to a next-hop segment node of the ingress node based on a segment identifier that is of the next-hop segment node of the ingress node and that is in the segment list. In a possible design, the segment list includes the segment identifier of the ingress node. In this way, a network performance parameter of the ingress node is added to the segment identifier that is of the ingress node and that is in the segment list, and a network performance parameter of an intermediate node on the forwarding path is added to a segment identifier that corresponds to the intermediate node and that is in the segment list. In this way, the network performance parameter of the network node one-to-one corresponds to the segment identifier of the network node. This helps increase network performance calculation efficiency.

According to a second aspect, an embodiment provides a network performance calculation method. The method includes: A second network node receives a packet that is sent by a first network node and that includes a segment list, where a first segment identifier in the segment list includes a network performance parameter of the first network node. The second network node determines that a DA of the packet matches a segment identifier of the second network node. In response to determining that the DA of the packet matches the segment identifier of the second network node, the second network node obtains the network performance parameter of the first network node. The second network node calculates network performance based on the network performance parameter of the first network node.

According to the method, in a process of forwarding the packet by using the segment list in the packet, the first network node uses the segment list to carry the network performance parameter of the network node, and the second network node directly obtains the network performance parameter from the segment list and calculates the network performance. Because no extra packet header is needed to carry the network performance parameter, a packet header length is reduced, and a network resource is saved.

In a possible design, the first segment identifier further includes a network performance parameter type. That the second network node obtains the network performance parameter of the first network node includes: The second network node obtains the network performance parameter of the first network node based on the network performance parameter type.

In a possible design, the network performance parameter type includes a time type, a type of a quantity of sent packets, and a queue occupation type.

In a possible design, the network performance parameter of the first network node includes a first time at which the first network node sends the packet to the second network node, or a first quantity of service packets that are sent by using the segment list and that are received by the first network node before the first network node sends the packet.

In a possible design, that the second network node calculates network performance based on the network performance parameter of the first network node includes: The second network node determines a second time at which the second network node receives the packet. The second network node calculates a forwarding delay of sending the packet from the first network node to the second network node, where the forwarding delay is equal to a difference between the second time and the first time.

In a possible design, a second segment identifier in the segment list includes a network performance parameter of a third network node, and the third network node is a network node between the first network node and the second network node on a forwarding path of the packet. The network performance parameter of the third network node includes a third time at which the third network node sends the packet to the second network node. That the second network node calculates network performance based on the first network performance parameter includes: The second network node calculates a forwarding delay of forwarding the packet from the first network node to the third network node, where the forwarding delay is equal to a difference between the third time and the first time.

In a possible design, that the second network node calculates network performance based on the first network performance parameter includes: The second network node determines a second quantity of service packets that are sent by using the segment list and that are received by the second network node before the second network node receives the packet. The second network node calculates a quantity of lost packets that are of the service packets sent by using the segment list and that are forwarded from the first network node to the second network node, where the quantity of lost packets is equal to a difference between the second quantity and the first quantity.

In a possible design, a second segment identifier in the segment list includes a network performance parameter of a third network node, and the third network node is a network node between the first network node and the second network node on a forwarding path of the packet. The network performance parameter of the third network node includes a third quantity of service packets that are forwarded by using the segment list and that are received when the third network node forwards the packet. That the second network node calculates network performance based on the first network performance parameter includes: The second network node calculates a quantity of lost packets that are of the service packets forwarded by using the segment list and that are forwarded from the first network node to the third network node, where the quantity of lost packets is equal to a difference between the third quantity and the first quantity.

In a possible design, a service identifier of the service packet sent by using the segment list may be a service label, an Internet Protocol (IP) address, or a combination of an IP address and a port number.

In a possible design, the first segment identifier is the segment identifier of the second network node, and the second network node is a next-hop segment node of the first network node. The first network node adds the network performance parameter to a segment identifier of the next-hop segment node of the first network node.

In a possible design, the segment list includes a segment identifier of the first network node, and the first segment identifier is the segment identifier of the first network node. The first network node adds the network performance parameter to the segment identifier of the first network node.

According to a third aspect, an embodiment provides a network node, to perform the method performed by the first network node in any one of the first aspect or the possible implementations of the first aspect. Specifically, the network node includes units configured to perform the method in any one of the first aspect or the possible implementations of the first aspect.

According to a fourth aspect, an embodiment provides a network node, to perform the method performed by the second network node in any one of the second aspect or the possible implementations of the second aspect. Specifically, the network node includes units configured to perform the method in any one of the second aspect or the possible implementations of the second aspect.

According to a fifth aspect, a network node is provided. The network node includes a processor, a network interface, and a memory. The network interface may be a transceiver. The memory may be configured to store program code, and the processor is configured to invoke the program code in the memory to perform the method performed by the first network node in any one of the first aspect or the possible implementations of the first aspect. Details are not described herein again.

According to a sixth aspect, a network node is provided. The network node includes a processor, a network interface, and a memory. The network interface may be a transceiver. The memory may be configured to store program code, and the processor is configured to invoke the program code in the memory to perform the method performed by the second network node in any one of the second aspect or the possible implementations of the second aspect. Details are not described herein again.

According to a seventh aspect, a network node is provided, where the network node is a first network node in a plurality of network nodes. The plurality of network nodes further include a second network node, and the network node includes a main control board and an interface board. The main control board includes a first processor and a first memory. The interface board includes a second processor, a second memory, and an interface card. The main control board and the interface board are coupled. The first memory may be configured to store program code, and the first processor is configured to invoke the program code in the first memory to perform the following operations: obtaining a segment identifier of the second network node in a segment list of a first packet, where the second network node is a next-hop segment node of the first network node on a forwarding path of the first packet; and adding a network performance parameter of the first network node to the segment list.

The second memory may be configured to store program code, and the second processor is configured to invoke the program code in the second memory to perform the following operation: sending, to the second network node, the first packet to which the network performance parameter of the network node is added.

According to an eighth aspect, a network node is provided, where the network node is a second network node in a plurality of network nodes. The plurality of network nodes further include a first network node, and the network node includes a main control board and an interface board. The main control board includes a first processor and a second memory. The interface board includes a second processor, a second memory, and an interface card. The main control board and the interface board are coupled. The second memory may be configured to store program code, and the second processor is configured to invoke the program code in the second memory to perform the following operation: receiving a packet that is sent by the first network node and that includes a segment list, where a first segment identifier in the segment list includes a network performance parameter of the first network node.

The first memory may be configured to store program code, and the first processor is configured to invoke the program code in the first memory to perform the following operations: determining that a DA of the packet matches a segment identifier of the second network node; obtaining the network performance parameter of the first network node; and calculating network performance based on the network performance parameter of the first network node.

In a possible implementation, an inter-process communication (IPC) channel is established between the main control board and the interface board, and the main control board and the interface board communicate with each other through the IPC channel.

According to a ninth aspect, a network performance calculation system is provided. The system includes the network node provided in the third aspect and the network node provided in the fourth aspect. Alternatively, the system includes the network node provided in the fifth aspect and the network node provided in the sixth aspect. Alternatively, the system includes the network node provided in the seventh aspect and the network node provided in the eighth aspect.

According to a tenth aspect, a computer storage medium is provided. The computer storage medium is configured to store a computer software instruction used by the network node, and the computer storage medium includes a program used to perform the aspects.

According to an eleventh aspect, a computer program product including a computer program instruction is provided. When the computer program product runs on a network node, the network node is enabled to perform the method provided in any one of the first aspect, the second aspect, the possible implementations of the first aspect, or the possible implementations of the second aspect.

DETAILED DESCRIPTION

The following describes embodiments with reference to accompanying drawings.

In a process of forwarding a packet in an SRv6 network, an ingress device in the SRv6 network adds a segment routing header (SRH) to the packet. The SRH includes a segment list used to identify a forwarding path. The segment list includes an IPv6 address of a network node that supports an SRv6 function and that the packet passes through on the forwarding path of the packet. The ingress device for forwarding the packet in the SRv6 network may also be referred to as an ingress node or an ingress provider edge (PE) device. In an SRv6 technology, the IPv6 address that is of the network node and that is in the segment list may also be referred to as a segment identifier (SID) of the network node. The segment list may also be referred to as an SID list. Each SID occupies 128 bits. The SID may include a locator and a function. A quantity of bits that are of the SID and that are occupied by the locator is not limited. For example, the locator includes the first 64 bits or the first 55 bits of the SID of the network node. The locator is used to route the packet to the network node corresponding to the SID. For example, a forwarding node may forward, based on the locator included in the SID, the packet to the network node corresponding to the SID. Specifically, the locator part of the SID is used to search for a routing table. Then, based on a matched routing entry, the packet is sent to the network node corresponding to the SID. The function is used to indicate the network node corresponding to the SID to perform a corresponding function. For example, when the network node receives the packet, a DA of the packet is determined as the address of the network node, namely, the segment identifier of the network node. The network node performs the corresponding function based on the function in the segment identifier. An SID of each network node needs to be notified to another network node in the network, for example, to an edge node or a controller in the SRv6 network. The edge node or the controller generates, based on the collected SID of the network node, the segment list used to forward the packet. The SID is a segment identifier used to represent a specific segment in a segment routing domain. For definitions of the segment list and the SID, refer to an SRv6-related draft disclosed by the Internet Engineering Task Force (IETF), for example, draft-filsfils-spring-srv6-network-programming-04.

The controller may be a network management device or a controller in a software-defined networking (SDN) architecture. The network node may be a network device, for example, a router, a switch, or a forwarder in an SDN network.

Figure 1:
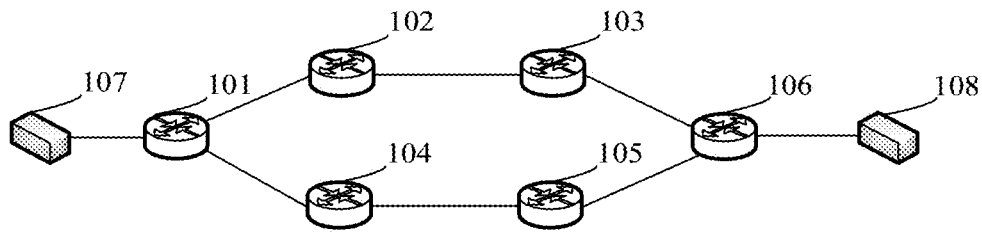
FIG. 1 is a schematic diagram of a network scenario according to an embodiment.

FIG. 1 is a schematic diagram of a scenario according to an embodiment. The scenario includes a network that supports an SRv6 function, namely, an SRv6 network. The network includes network nodes that support the SRv6 function, for example, a network node 101, a network node 102, a network node 103, a network node 104, a network node 105, and a network node 106. In the SRv6 network, that the network node supports the SRv6 function means that the network node supports an IPv6 segment routing function. A segment identifier of the network node 101 is an SID 1, and the SID 1 is also an IPv6 address of the network node 101, for example, A::. A segment identifier of the network node 102 is an SID 2, and the SID 2 is also an IPv6 address of the network node 102, for example, B::. A segment identifier of the network node 103 is an SID 3, and the SID 3 is also an IPv6 address of the network node 103, for example, C::. A segment identifier of the network node 106 is an SID 6, and the SID 6 is also an IPv6 address of the network node 106, for example, D::. When a packet is forwarded from the network node 101 to the network node 106, the network node 101 is referred to as an ingress node in the SRv6 network, and the network node 106 is referred to as an egress node in the SRv6 network. The scenario further includes user equipment 107 and user equipment 108 that are connected by using the SRv6 network. Optionally, the user equipment 107 may be further connected to the network node 101 by using a user access device, and the user equipment 108 may also be connected to the network node 106 by using a user access device.

The embodiments provide a network performance parameter sending method, a network performance calculation method, and a network node and a system based on the methods. The methods, the network node, and the system are based on a same concept. Principles of resolving problems by the methods, the network node, and the system are similar. Therefore, for the embodiments of the network node, the methods, and the system, refer to each other, and same or similar content is not described.

Figure 2:
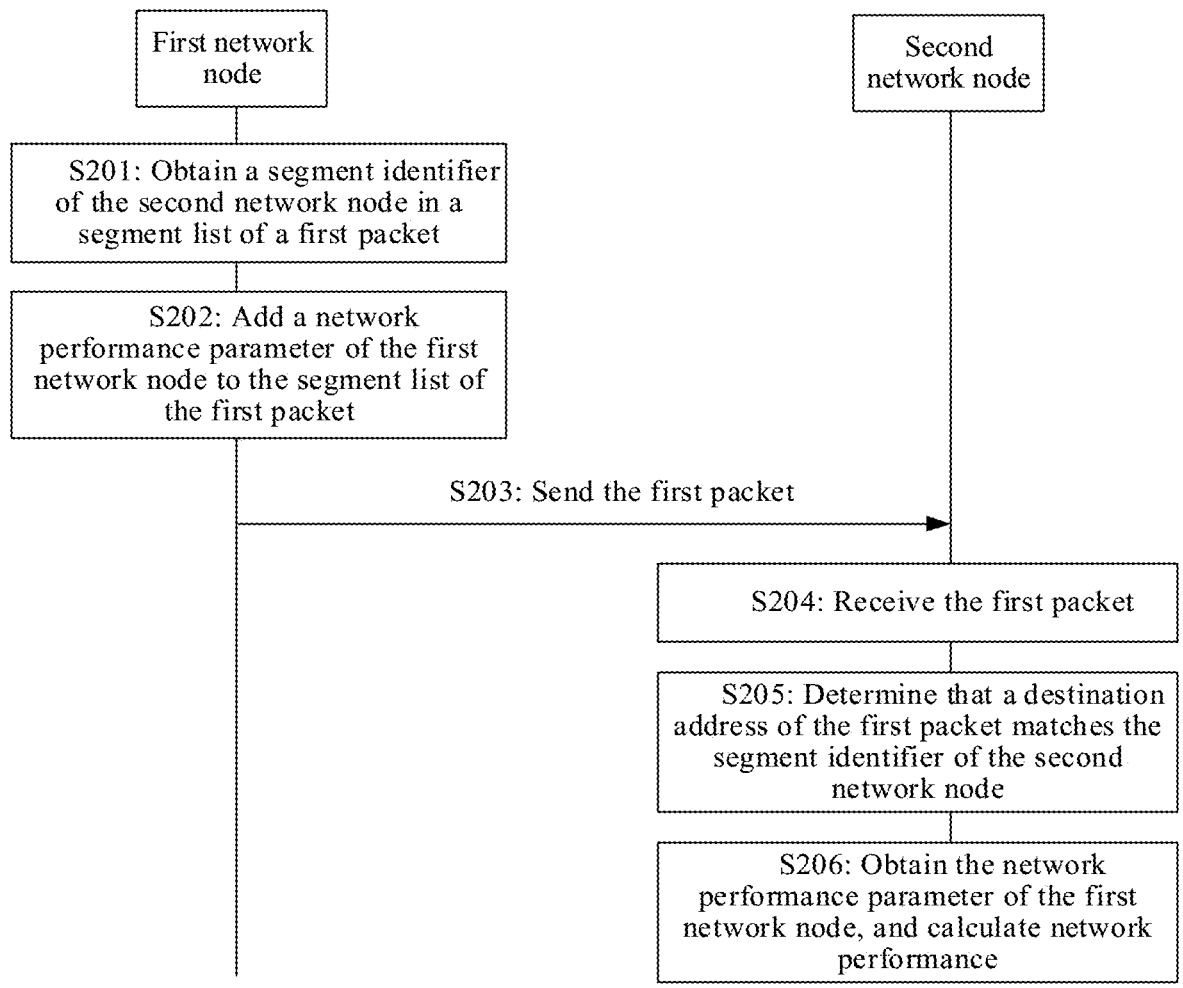
FIG. 2 is a schematic flowchart of a network performance calculation method according to an embodiment.

With reference to the scenario shown in FIG. 1, referring to FIG. 2, an embodiment provides a network performance parameter sending method and a network performance calculation method. In the method, a first network node adds network performance parameter of the first network node to a segment list of a packet, and then sends the packet to a second network node. After receiving the packet, the second network node obtains the network performance parameter of the first network node from the segment list of the packet, and then calculates network performance based on the network performance parameter of the first network node. The method includes:

S201: A first network node obtains a segment identifier of a second network node in a segment list of a first packet, where the second network node is a next-hop segment node of the first network node on a forwarding path of the first packet. The next-hop segment node of the first network node is a network node that supports the segment routing function and that is closest to the first network node along a packet forwarding direction on the forwarding path. The forwarding path of the first packet is a forwarding path used to forward the first packet.

An example in which the first network node is the network node 101 in FIG. 1 is used for description. In the scenario shown in FIG. 1, there are two paths from the network node 101 to the network node 106. Network nodes that a first path passes through include the network node 102, the network node 103, and the network node 106. Network nodes that a second path passes through include the network node 104, the network node 105, and the network node 106. The network node 101 obtains a segment list of the first optimal path in the two paths. SIDs in the segment list may be arranged in descending order of the network nodes that the packet passes through on the first path. For example, the segment list is <SID 6, SID 3, and SID 2>. Alternatively, SIDs in the segment list may be arranged in ascending order of the network nodes that the packet passes through on the first path. For example, the segment list is <SID 2, SID 3, SID 6>. The segment list may be generated by the network node 101 or obtained from a controller. The network node 101 obtains a correspondence between a DA of the first packet and the segment list. For example, when the DA of the first packet is D::, the first network node obtains a correspondence between the address D:: and the segment list <SID 2, SID 3, SID 6>. The correspondence may be pre-stored in the network node 101, or may be stored in another network device. For example, the correspondence may be pre-stored in the controller. When the network node 101 receives the first packet, the network node 101 obtains the correspondence from the controller. In this example, because the network node 101 obtains a next-hop segment node of the network node 101 by using the segment list, the network node 101 may forward the first packet to the network node 106 along the first path. Therefore, the segment list may not include the segment identifier of the network node 101. Optionally, the segment list may alternatively include the segment identifier of the network node 101. For example, the segment list may be <SID 6, SID 3, SID 2, SID 1>, or <SID 1, SID 2, SID 3, SID 6>. When the segment list includes the segment identifier of the network node 101, the segment identifier of the network node 101 is not used to forward the packet, and may be used to carry a network performance parameter of the network node 101.

In an example, that the first network node obtains a first packet means that the first network node receives a second packet from user equipment, and then generates the first packet based on the second packet. For example, the first network node is the network node 101 in the scenario shown in FIG. 1, the second network node is the network node 102, the network node 101 is connected to the user equipment 107, the network node 106 is connected to the user equipment 108, and the user equipment 107 and the user equipment 108 may not support the segment routing function. When the user equipment 107 needs to send a packet to the user equipment 108, the user equipment 107 generates a second packet whose DA is an address of the user equipment 108, and then sends the second packet to the network node 101. The network node 101 is used as an ingress node for forwarding the second packet in the SRv6 network, receives the second packet, and then matches a forwarding policy based on the DA of the second packet. The forwarding policy is received in advance by the network node 101 from the controller, or is generated by the network node 101. The forwarding policy includes a correspondence between the DA and a segment list. When determining that the DA of the second packet matches a DA in the forwarding policy, the network node 101 inserts an SRH into the second packet to generate the first packet. The SRH includes a segment list <IPv6 address, SID 6, SID 3, and SID 2>, where the IPv6 address is an IPv6 address of target user equipment, for example, the address of the user equipment 108. In another case of this example, if the user equipment 107 needs to send a packet only to the network node 106, for example, the network node 106 is a server device, the segment list includes a segment identifier of the network node that supports the segment routing function and that the packet passes through on a forwarding path. For example, the segment list is <SID 6, SID 3, SID 2>.

In an example, that the first network node obtains a first packet means that the first network node receives the first packet from another network node that supports the segment routing function. For example, the first network node is the network node 102 in the scenario shown in FIG. 1, the second network node is the network node 103, and the first network node is an intermediate node on the forwarding path of the first packet. The first network node receives the first packet from the network node 101 in FIG. 1. The network node 101 is used as an ingress node for forwarding the first packet, and has added an SRH to the first packet, where the SRH includes a segment list <SID 6, SID 3, SID 2>, or <IPv6 address, SID 6, SID 3, SID 2>.

In an example, that the first network node obtains a first packet means that the first network node generates the first packet. For example, the first network node is the network node 101 in the scenario shown in FIG. 1, the second network node is the network node 102, and the first network node is an ingress node on the forwarding path of the first packet. When the network node 101 needs to send an IPv6 packet to the network node 106, the network node 101 searches for a segment list based on the IPv6 address D:: of the network node 106, and then inserts an SRH between an IPv6 packet header and a packet payload of the IPv6 packet, where the SRH includes the segment list. The network node 101 obtains a segment identifier of the next-hop segment node of the network node 101 from the segment list, namely, the segment identifier SID 2 of the network node 102, and then replaces the DA of the first packet with the SID 2. To be specific, a value of a DA field of the first packet is replaced with the SID 2.

In an example, the segment list may be stored in a memory of the first network node in a form of a data structure. The data structure may be an array, a linked list, or a structure. For example, when the data structure is the array, the SID 6 may be the first member of the array, the SID 3 may be the second member of the array, and the SID 2 may be the third member of the array. A processor of the first network node may perform a read operation on the third member that is of the array and that is stored in the memory, to obtain the SID 2 from the memory.

S202: The first network node adds the network performance parameter of the first network node to the segment list.

In an example, the network performance parameter includes one or more of the following: a time at which the first network node sends the first packet; a quantity of service packets that are sent by using the segment list and that are received by the first network node before the first network node sends the first packet; and a queue occupation rate of a packet sending queue of the first network node, where the packet sending queue is a FIFO queue for storing the first packet.

The first network node replaces the DA of the first packet with the segment identifier of the second network node, to be specific, updates the value of the DA field of the first packet to the segment identifier of the second network node. The segment identifier of the second network node is an IPv6 address of the second network node. Therefore, the first network node replaces the DA of the first packet with the segment identifier of the second network node, to be specific, replaces the DA of the first packet with the IPv6 address of the second network node.

In an example, the segment identifier of the second network node includes a network performance parameter type, and the network performance parameter of the first network node is a network performance parameter indicated by the network performance parameter type. The network performance parameter type includes a time type, a type of a quantity of sent packets, and a queue occupation type. When the network parameter type is the time type, the first network node adds, to the segment list, the time at which the first network node sends the first packet. When the network parameter type is the type of the quantity of sent packets, the first network node adds, to the segment list, the quantity of service packets that are sent by using the segment list and that are received before the first network node sends the first packet. When the network parameter type is the queue occupation type, the first network node adds, to the segment list, the queue occupation rate of the packet sending queue for storing the first packet. The network performance parameter type is included in the segment identifier, so that the network performance parameter can be sent on demand. For example, when a forwarding delay of the packet in the network needs to be calculated, the network performance parameter type in the segment identifier is set to the time type.

In an example, that the first network node adds the network performance parameter of the first network node to the segment list includes:

After the first network node obtains the segment identifier that is of the second network node and that is in the segment list of the first packet, the first network node modifies the segment identifier that is of the second network node and that is in the segment list to add the network performance parameter to the segment identifier that is of the second network node and that is in the segment list. Optionally, the first network node modifies the segment identifier that is of the second network node and that is in the segment list to add the network performance parameter to the 65th bit to the 128th bit of the segment identifier of the second network node.

Figure 3:
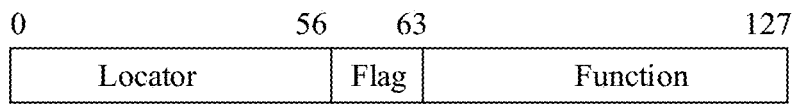
FIG. 3 is a schematic diagram of an SID format according to an embodiment.

FIG. 3 is a schematic diagram of a format of a segment identifier according to an embodiment. In the embodiment shown in FIG. 2, the segment identifier used to carry the network performance parameter may use the format of the segment identifier shown in FIG. 3. For example, the segment identifier of the second network node uses the format of the segment identifier shown in FIG. 3. The segment identifier occupies 128 bits in total, for example, 0 to 127 bits shown in figure.

A locator field occupies 0 to 56 bits and stores a prefix part of an IPv6 address. The locator field is used to route and forward a packet and identify a network node.

A flag field occupies 57 to 63 bits, and is used to indicate a network performance parameter type.

A function field occupies 64 to 127 bits.

The flag may have a plurality of values, and may identify a plurality of network performance parameter types. Values of the flag are as follows:

flag=1, indicating that the network performance parameter type is a time type, and indicating a network node that forwards the packet by using the segment identifier to add a packet sending time to the function field of the segment identifier;

flag=2, indicating that the network performance parameter type is a type of a quantity of sent packets, and indicating a network node that forwards the packet by using the segment identifier to add a quantity of received packets forwarded by using the segment list to the function field of the segment identifier; and flag=3, indicating that the network performance parameter type is a queue occupation type, and indicating a network node that forwards the packet by using the segment identifier to add a queue depth of a packet sending queue for storing the packet to the function field of the segment identifier, where the queue depth may be represented by a queue occupation rate.

In an example, an SID that is of the second network node and that is notified by the second network node to another node in a network includes the flag field. Because the flag in the SID of the second network node may have a plurality of values, a plurality of SIDs need to be notified to the another network node.

In an example, an SID that is of the second network node and that is notified by the second network node to another node in a network does not include the flag field, or an SID that is of the second network node and that is notified by the second network node to another node in a network includes the flag field, but a value of the flag field is 0. The second network node only needs to advertise one SID to the another node in the network, but the second network node needs to advertise a value of a supported flag to the another node in the network. For example, a type of the supported flag is notified by using a segment-routing-capability sub-type-length-value (SR-capabilities sub-TLV) field. For details about the SR-capabilities sub-TLV, refer to draft-ietf-isis-segment-routing-extensions-16 disclosed by the IETF. In this way, the second network node may notify the value of the supported flag by using a packet including the SR-capabilities sub-TLV. After receiving the SID and the supported flag of the second network node, the controller or the ingress node in the SRv6 network adds the flag value to the SID when generating the segment list. For a format of the SID to which the flag value is added, refer to FIG. 3. When the segment list is generated, the SID to which the flag value is added is used as the segment identifier of the second network node.

For example, when the first network node is the network node 101 in the scenario shown in FIG. 1, and the second network node is the network node 102, the network performance parameter of the first network node is stored in the SID 2 in the segment list <SID 6, SID 3, SID 2>. Each SID includes a locator, a flag, and a function. After the value of the DA field of the first packet is replaced with the SID 2, the SID 2 in the segment list may be used for another purpose. For example, the network performance parameter of the first network node is stored in a function part of the SID 2. When the function part occupies the 65th bit to the 128th bit of the SID 2, the network performance parameter of the first network node is stored between the 65th bit and the 128th bit of the SID 2. In this example, the locator may occupy a plurality of the first to the 64th bits of the SID, and the corresponding flag and the corresponding function occupy bits other than the bits occupied by the locator in the SID. For example, the locator occupies the first to the 57th bits of the SID, the flag occupies the 58th to 64th bits of the SID, and the function may occupy the 65th to 128th bits of the SID.

In an example, when the first network node is the network node 101 in the scenario shown in FIG. 1, and the second network node is the network node 102, the segment list further includes a segment identifier of the first network node. For example, the segment list is <SID 6, SID 3, SID 2, SID 1>, and the first network node may include the network performance parameter of the first network node in the segment identifier that is of the first network node and that is in the segment list. For example, the network performance parameter of the first network node is stored in the SID 1 in the segment list <SID 6, SID 3, SID 2, SID 1>.

In an example, when the first network node is the network node 101 in the scenario shown in FIG. 1, and the second network node is the network node 102, the segment list does not include a segment identifier of the first network node. For example, the segment list is <SID 6, SID 3, SID 2>, and the first network node may include the network performance parameter of the first network node in another field of the first packet, for example, an ingress node type-length-value (TLV) in the SRH. Another network node may store a corresponding network performance parameter in a corresponding SID. For example, a network performance parameter of the second network node is stored in the SID 2 in the segment list <SID 6, SID 3, SID 2>, and a network performance parameter of the third network node is stored in the SID 3.

S203: The first network node sends, to the second network node, the first packet to which the network performance parameter of the first network node is added.

S204: The second network node receives the first packet sent by the first network node.

S205: The second network node determines that the DA of the first packet matches the segment identifier of the second network node.

S206: The second network node obtains the network performance parameter that is of the first network node and that is in the segment list of the first packet, and calculates network performance based on the network performance parameter of the first network node. The network performance parameter is included in one segment identifier in the segment list.

In an example, when the segment identifier includes the network performance parameter type, that the second network node obtains the network performance parameter of the first network node includes:

The second network node obtains the network performance parameter of the first network node based on the network performance parameter type. For example, when determining that the network performance parameter type is the time type, the second network node determines that the network performance parameter is the time at which the first network node sends the first packet.

In an example, if the second network node determines that the DA of the first packet is the same as the segment identifier of the second network node, the second network node determines that the value of the DA field of the first packet matches the segment identifier of the second network node. Alternatively, if the second network node determines that a locator part in the DA field of the first packet is the same as a locator part of the segment identifier of the second network node, the second network node determines that the value of the DA field of the first packet matches the segment identifier of the second network node.

In an example, when the SID advertised by the second network node to the another network node in the network does not include the flag, after receiving the SID and the supported flag of the second network node, the controller or the ingress node in the SRv6 network adds the flag value to the SID when generating the segment list. After receiving the second packet, the second network node cannot identify an SID included in a DA field of the second packet, and the second network node needs to first set a flag field in the DA field of the second packet to 0. Then, a value of the DA field of the second packet is matched with the segment identifier of the second network node. For example, if the flag is in the 58th bit to the 64th bit of the DA field of the second packet, values of the 58th bit to the 64th bit of the DA field of the second packet need to be first reset. After determining that the value of the DA field of the second packet matches the segment identifier of the second network node, the second network node generates or modifies an SID forwarding entry, where an index of the SID forwarding entry is the SID that is of the second network node and that includes the flag. In this way, if the second network node receives the packet whose DA field includes the flag again, the second network node may directly search for the SID forwarding entry, and does not need to reset the values of the 58th bit to the 64th bit of the DA field of the packet. This simplifies a subsequent packet forwarding processing procedure.

In an example, a third network node further exists between the first network node and the second network node on the forwarding path of the packet. As shown in FIG. 1, the first network node is the network node 101 in FIG. 1, the second network node is the network node 106, and the third network node is the network node 102 or the network node 103. A second segment identifier in the segment list includes a network performance parameter of the third network node. The network performance parameter of the third network node includes a third time at which the third network node sends the packet to the second network node. Alternatively, the network performance parameter of the third network node includes a third quantity of service packets that are forwarded by using the segment list and that are received when the third network node forwards the first packet.

The second network node may calculate the network performance based on the network performance parameter of the first network node in one or more of the following manners.

A first manner for calculating a forwarding delay:

The second network node determines a second time at which the second network node receives the first packet.

The second network node calculates a forwarding delay of sending the first packet from the first network node to the second network node, where the forwarding delay is equal to a difference between the second time and the first time.

A second manner for calculating a forwarding delay:

The second network node calculates a forwarding delay of forwarding the first packet from the first network node to the third network node, where the forwarding delay is equal to a difference between the third time and the first time.

A first manner for calculating a quantity of lost packets:

The second network node determines a second quantity of service packets that are sent by using the segment list and that are received by the second network node before the second network node receives the first packet.

The second network node calculates a quantity of lost packets that are of the service packets forwarded by using the segment list and that are forwarded from the first network node to the second network node, where the quantity of lost packets is equal to a difference between the second quantity and the first quantity.

A second manner for calculating a quantity of lost packets:

The second network node calculates a quantity of lost packets that are of the service packets forwarded by using the segment list and that are forwarded from the first network node to the third network node, where the quantity of lost packets is equal to a difference between the third quantity and the first quantity.

In an example, the second network node may send the obtained network performance parameter of the network node on the forwarding path to the controller, and the controller calculates the network performance.

In an example, the method further includes: When determining that a segment left field in the SRH in the first packet is 0, the second network node deletes the SRH from the first packet to restore the second packet, and then forwards the second packet to the user equipment based on an IPv6 address in an IPv6 packet header of the second packet. For example, when the second network node is the network node 106 in the scenario shown in FIG. 1, the network node 106 searches for an IPv6 routing table based on an IPv6 address in an IPv6 packet header of a user packet, and then forwards the user packet to the user equipment 108.

According to the method, in the process of forwarding the packet by using the segment list in the packet, the first network node uses the segment list to carry the network performance parameter of the network node, and the second network node may directly use the network performance parameter in the segment list to calculate the network performance. Because no extra packet header is needed to carry the network performance parameter, a packet header length is reduced, and a network resource is saved.

Figure 4:
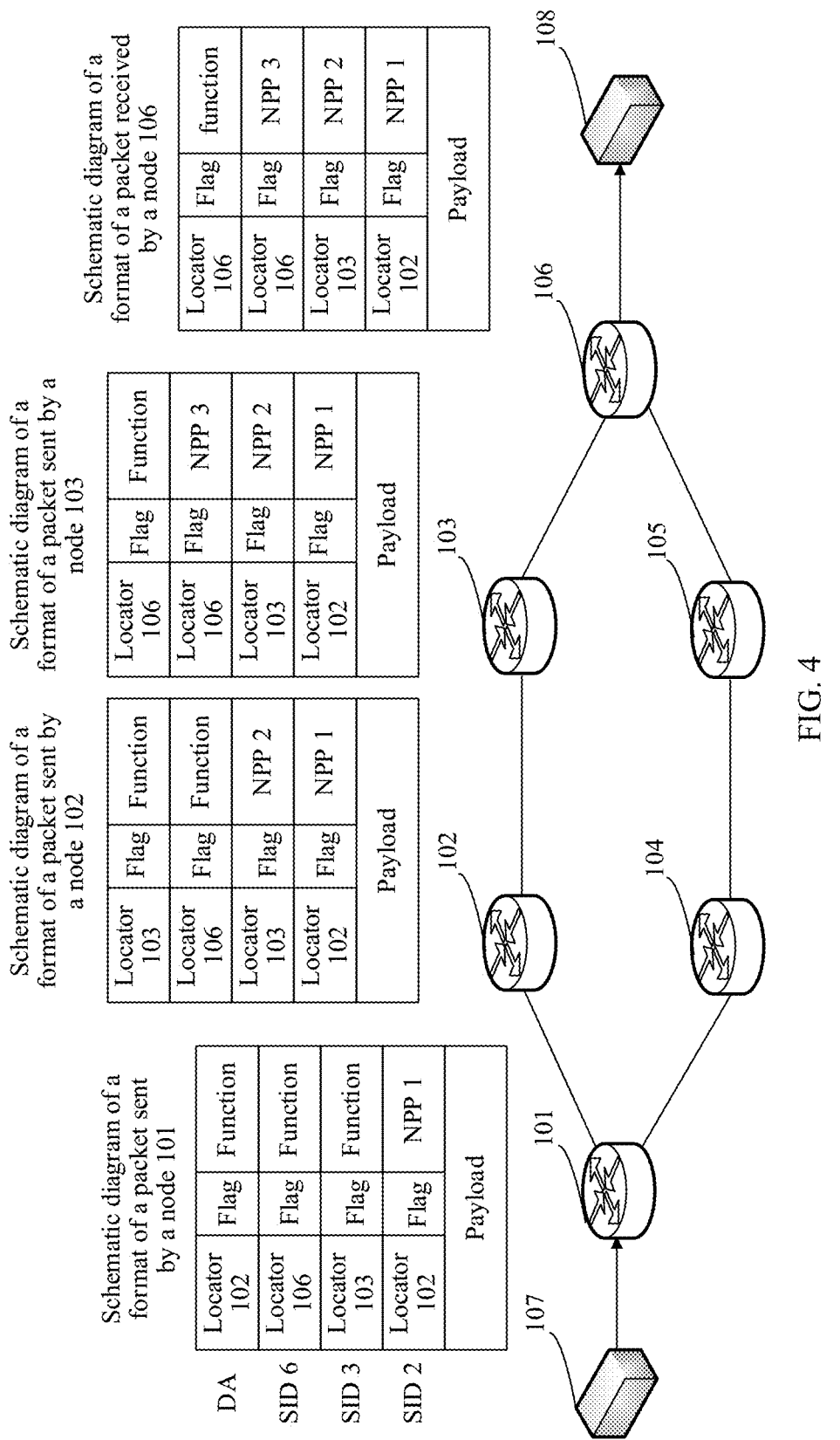
FIG. 4 is a schematic diagram of a network performance parameter sending method according to an embodiment.
Figure 5:
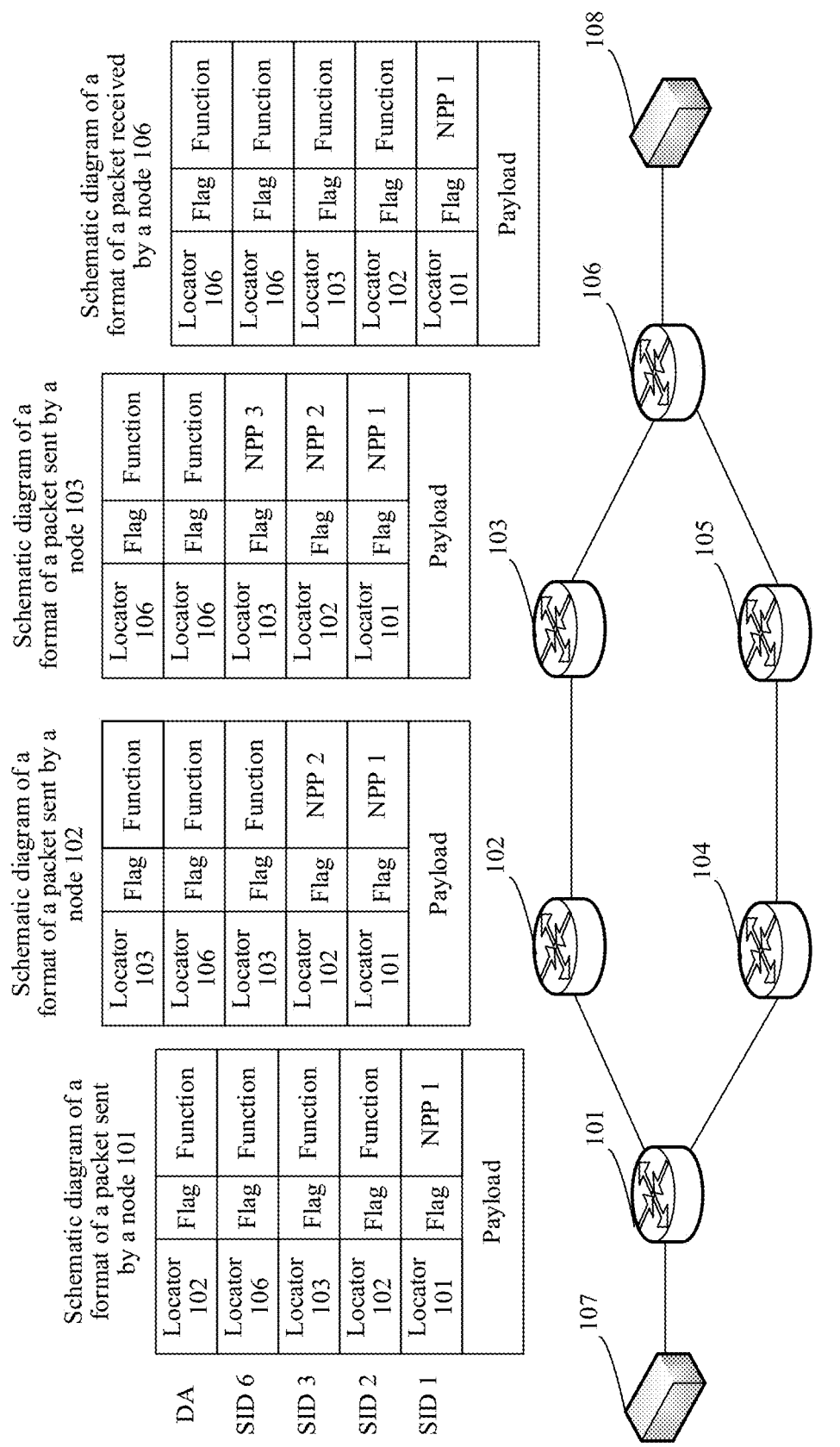
FIG. 5 is a schematic diagram of a network performance parameter sending method according to an embodiment.
Figure 6:
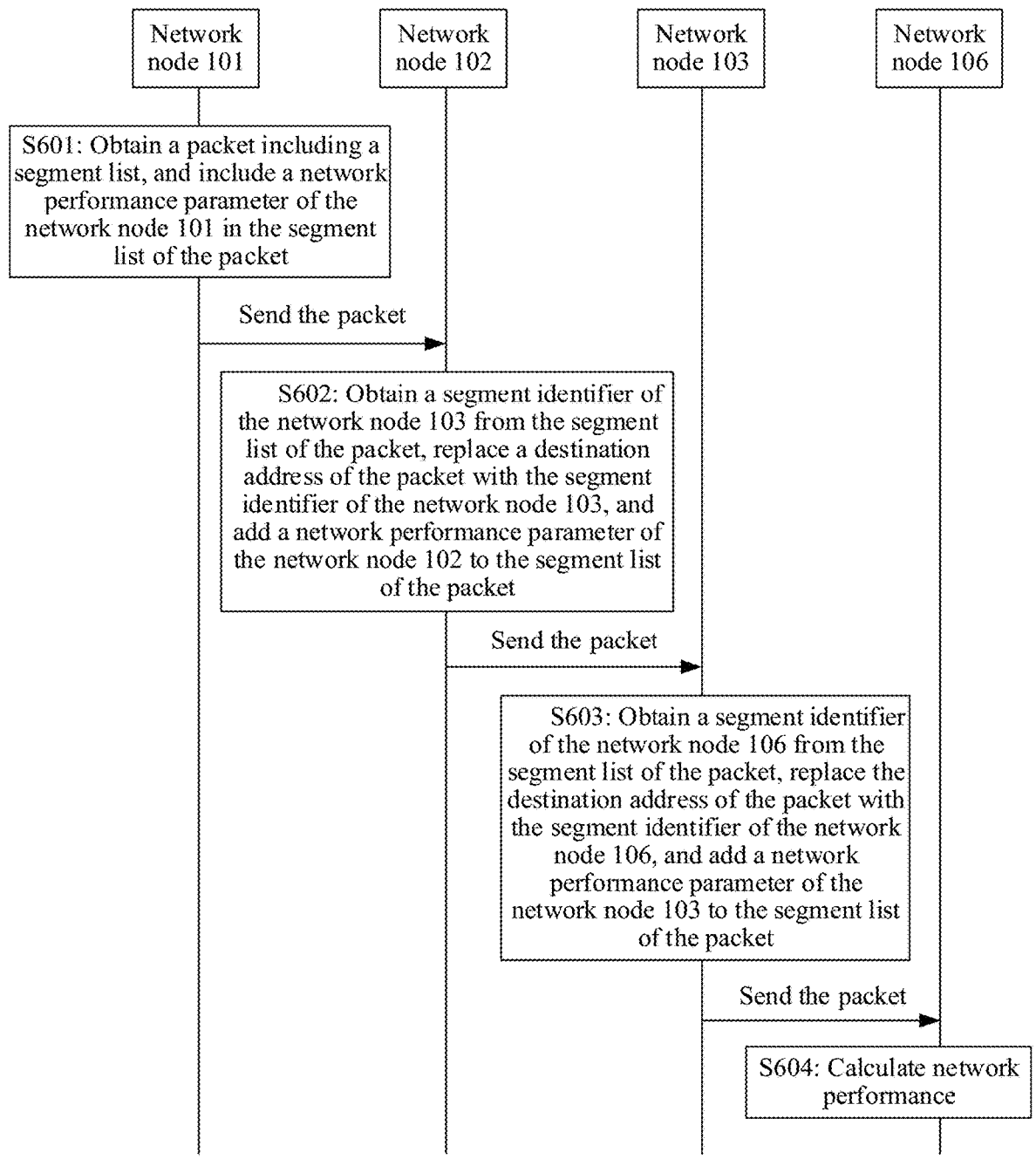
FIG. 6 is a schematic flowchart of a network performance calculation method according to an embodiment.

Referring to FIG. 4, FIG. 5, and FIG. 6, an embodiment provides a network performance parameter calculation method. FIG. 4 and FIG. 5 are schematic diagrams of a network performance parameter sending method in the scenario shown in FIG. 1. The segment identifier of the network node 101 is the SID 1, the segment identifier of the network node 102 is the SID 2, the segment identifier of the network node 103 is the SID 3, and the segment identifier of the network node 106 is the SID 6. FIG. 6 is a schematic flowchart of a network performance calculation method according to an embodiment. Referring to FIG. 6, the method includes the following steps.

S601: The network node 101 obtains a packet sent to the network node 106, where the packet includes an IPv6 packet header, an SRH, and a payload, as shown in a schematic table of a packet format in FIG. 4. For example, only a DA is shown in the IPv6 packet header, and the SRH shows only a segment list. A flag field is a network performance parameter type, and an NPP field is a network performance parameter (NPP). The network node 101 replaces the DA of the packet with the SID 2, adds a network performance parameter of the network node 101 to the segment list, and sends, to the network node 102, the packet to which the network performance parameter of the network node 101 is added.

In an example, a segment list included in the SRH is <SID 6, SID 3, SID 2>. The network node 101 obtains a corresponding network performance parameter based on a network performance parameter type identified by a flag in the SID 2, and adds the network performance parameter to the SID 2 in the segment list. As shown in FIG. 4, a network performance parameter NPP 1 of the network node 101 is stored in a function field of the SID 2.

In an example, a segment list included in the SRH is <SID 6, SID 3, SID 2, SID 1>. The network node 101 obtains a corresponding network performance parameter based on a network performance parameter type identified by a flag in the SID 1, and adds the network performance parameter to the SID 1 in the segment list, as shown in FIG. 5, an NPP 1 is stored in a function field of the SID 1.

S602: The network node 102 receives the packet. When determining that a value of a DA field of the packet matches the SID 2, the network node 102 obtains the SID 3 from the segment list in the packet, and replaces the DA of the packet with the SID 3. A network performance parameter of the network node 102 is added to the segment list, and the packet to which the network performance parameter of the network node 102 is added is sent to the network node 103.

In an example, a segment list included in the SRH is <SID 6, SID 3, SID 2>. The network node 102 obtains a corresponding network performance parameter based on a network performance parameter type identified by a flag in the SID 3, and adds the network performance parameter to the SID 3 in the segment list. As shown in FIG. 4, a network performance parameter NPP 2 of the network node 102 is stored in a function field of the SID 3.

In an example, a segment list included in the SRH is <SID 6, SID 3, SID 2, SID 1>. The network node 102 obtains a corresponding network performance parameter based on a network performance parameter type identified by a flag in the SID 2, and adds the network performance parameter to the SID 2 in the segment list. As shown in FIG. 5, an NPP 2 is stored in a function field of the SID 2.

In an example, the network node 101 is the first network node in the embodiment shown in FIG. 2, and the network node 102 may be the second network node in the embodiment shown in FIG. 2. The network node 102 may calculate network performance based on the network performance parameter in the segment list. For a specific manner of calculating the network performance, refer to the embodiment shown in FIG. 2, and details are not described herein again.

S603: The network node 103 receives the packet. When determining that the value of the DA field of the packet matches the SID 3, the network node 103 obtains the SID 6 from the segment list in the packet, and replaces the DA of the packet with the SID 6. A network performance parameter of the network node 103 is added to the segment list, and the packet to which the network performance parameter of the network node 103 is added is sent to the network node 106.

In an example, the segment list included in the SRH is <SID 6, SID 3, SID 2>. The network node 103 obtains a corresponding network performance parameter based on a network performance parameter type identified by a flag in the SID 6, and adds the network performance parameter to the SID 6 in the segment list. As shown in FIG. 4, a network performance parameter NPP 2 of the network node 103 is stored in a function field of the SID 6.

In an example, the segment list included in the SRH is <SID 6, SID 3, SID 2, SID 1>. The network node 103 obtains the corresponding network performance parameter based on the network performance parameter type identified by the flag in the SID 3, and adds the network performance parameter to the SID 3 in the segment list. As shown in FIG. 5, an NPP 3 is stored in the function field of the SID 3.

In an example, the network node 101 is the first network node in the embodiment shown in FIG. 2, the network node 102 is the second network node in the embodiment shown in FIG. 2, and the network node 103 is the third network node in the embodiment shown in FIG. 2. The network node 103 may calculate network performance based on the network performance parameter in the segment list. For a specific manner of calculating the network performance, refer to the embodiment shown in FIG. 2, and details are not described herein again.

S604: The network node 106 receives the packet, and when determining that the value of the DA field of the packet matches the SID 6, calculates the network performance based on the network performance parameter in the segment list.

In an example, when the segment list does not include a segment identifier of an ingress node, for example, when the segment list is <SID 6, SID 3, SID 2>, referring to FIG. 4, a network performance parameter of each network node is stored in a segment identifier of a next-hop segment node corresponding to the network node. For example, the network performance parameter NPP 1 of the network node 101 is stored in the SID 2 of the network node 102, the network performance parameter NPP 2 of the network node 102 is stored in the SID 3 of the network node 103, and the network performance parameter NPP 3 of the network node 103 is stored in the SID 6 of the network node 106. When the segment list includes a segment identifier of an ingress node, for example, when the segment list is <SID 6, SID 3, SID 2, SID 1>, referring to FIG. 5, a network performance parameter of each network node is stored in a segment identifier of the network node. For example, the network performance parameter NPP 1 of the network node 101 is stored in the SID1 of the network node 101, the network performance parameter NPP 2 of the network node 102 is stored in the SID 2 of the network node 102, and the network performance parameter NPP 3 of the network node 103 is stored in the SID 3 of the network node 103. After the network node 106 receives the packet, because the network node 106 is a last segment node indicated by the segment list, a network performance parameter of the network node 106 does not need to be included in the segment list, and the network performance needs to be calculated only based on the network performance parameter of each network node in the segment list. Optionally, when the segment list includes the segment identifier of the ingress node, the network node 106 determines that each SID includes a network performance parameter of a network node corresponding to the SID. When the segment list does not include the segment identifier of the ingress node, the network node 106 may determine that each SID includes a network performance parameter of a previous-hop network node of a network node corresponding to the SID. Optionally, flag types in the SIDs in the segment list are the same. After receiving the packet, the network node 106 may calculate, based on a flag value in the DA field of the packet, network performance for the type indicated by the flag. For example, when the flag value in the DA field of the packet is 1, to be specific, when each SID in the segment list records a network performance parameter related to a packet sending time, the network node 106 calculates network performance related to a packet forwarding delay.

In an example, the network node 106 is further connected to the user equipment 108, the DA of the packet is a DA of the user equipment 108, and the SRH further includes an IPv6 address of the user equipment. For example, the segment list included in the SRH is <IPv6 address, SID 6, SID 3, SID 2> or <IPv6 address, SID 6, SID 3, SID 2, SID1>, where the IPv6 address is the IPv6 address of the user equipment. The network node 106 deletes the SRH from the packet, and changes the DA of the packet to the IPv6 address of the user equipment to generate a user packet. Then, the network node 106 sends the user packet to the user equipment 108.

In an example, the network node 101 is the first network node in the embodiment shown in FIG. 2, the network node 102 or the network node 103 is the third network node in the embodiment shown in FIG. 2, and the network node 106 may be the second network node in the embodiment shown in FIG. 2. The network node 106 may calculate network performance based on the network performance parameter in the segment list. For a specific manner of calculating the network performance, refer to the embodiment shown in FIG. 2, and details are not described herein again.

A meaning of the network performance parameter of the network node in this embodiment is similar to a meaning of the network performance parameter in the embodiment shown in FIG. 2, and details are not described herein again.

Figure 7:
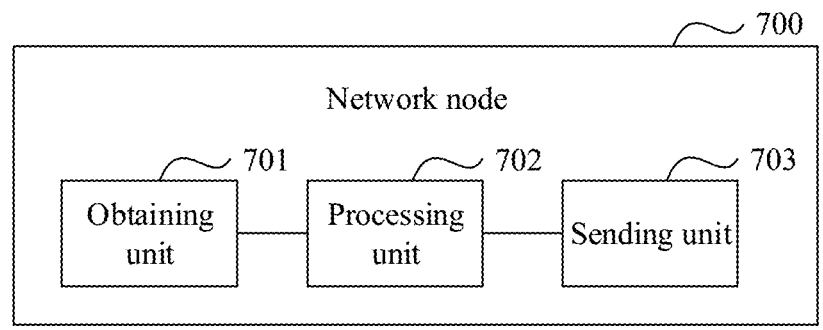
FIG. 7 is a schematic structural diagram of a network node according to an embodiment.

FIG. 7 is a possible schematic structural diagram of the first network node in the foregoing embodiments. The network node 700 may implement functions of the first network node in the embodiment shown in FIG. 2 or FIG. 6. Referring to FIG. 7, the network node 700 includes an obtaining unit 701, a processing unit 702, and a sending unit 703. These units may perform the corresponding functions of the first network node in the foregoing method examples. For example, the obtaining unit 701 is configured to perform packet obtaining performed by the first network node in the foregoing method embodiments. The processing unit 702 is configured to perform packet processing performed by the first network node in the foregoing method embodiments. The sending unit 703 is configured to perform packet sending performed by the first network node in the foregoing method embodiments. For example, the obtaining unit 701 is configured to obtain a segment identifier of a second network node in a segment list of a first packet. The processing unit 702 is configured to add a network performance parameter of the first network node 700 to the segment list. The sending unit 703 is configured to send, to the second network node, the first packet to which the network performance parameter of the network node 700 is added.

Figure 8:
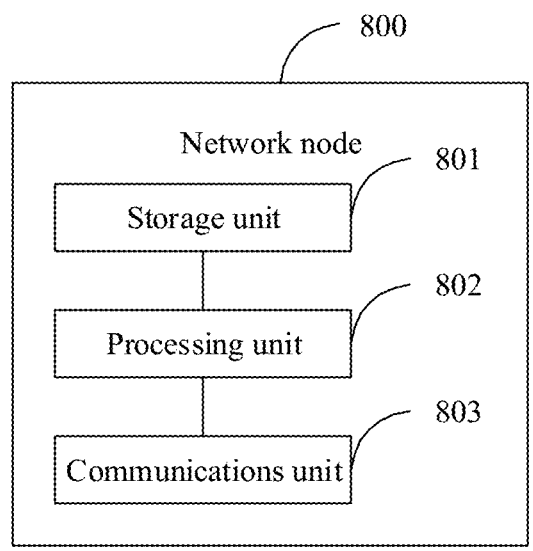
FIG. 8 is a schematic structural diagram of a network node according to an embodiment.

When an integrated unit is used, FIG. 8 is another possible schematic structural diagram of the first network node in the foregoing embodiments. The network node 800 may also implement the functions of the first network node in the embodiment shown in FIG. 2 or FIG. 6.

The network node 800 includes a storage unit 801, a processing unit 802, and a communications unit 803. The processing unit 802 is configured to control and manage an action of the first network node 800. For example, the processing unit 802 is configured to support the network node 800 in performing the processes S201, S202, and S203 in FIG. 2, the process S601 in FIG. 6, and/or another process used for the technology described in this specification. The communications unit 803 is configured to support the network node 800 in communicating with another network entity, for example, communicating with the second network node in FIG. 2 or the network node 102 in FIG. 6. The storage unit 801 is configured to store program code and data of the network node 800.

The processing unit 802 may be a processor, for example, a central processing unit (CPU), a general-purpose processor, a digital signal processor (DSP), an application-specific integrated circuit (ASIC), a field-programmable gate array (FPGA), or another programmable logic device, a transistor logic device, a hardware component, or any combination thereof. The processing unit 802 may implement or execute various example logical blocks, modules, and circuits described with reference to content disclosed in the embodiments. The processor may be a combination of processors implementing a computing function, for example, a combination of one or more microprocessors or a combination of the DSP and a microprocessor. The communications unit 803 may be a transceiver, and the storage unit 801 may be a memory.

Figure 9:
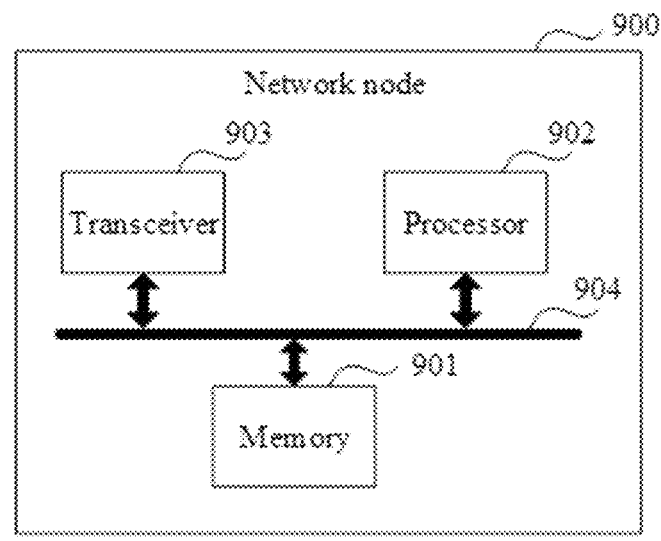
FIG. 9 is a schematic structural diagram of a network node according to an embodiment.

When the processing unit 802 is the processor, the communications unit 803 is the transceiver, and the storage unit 801 is the memory, the first network node in this embodiment may be a network node 900 shown in FIG. 9.

FIG. 9 is another possible schematic structural diagram of the first network node in the foregoing embodiments. The network node 900 includes a processor 902, a transceiver 903, a memory 901, and a bus 904. The transceiver 903, the processor 902, and the memory 901 are interconnected through the bus 904. The bus 904 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

Figure 10:
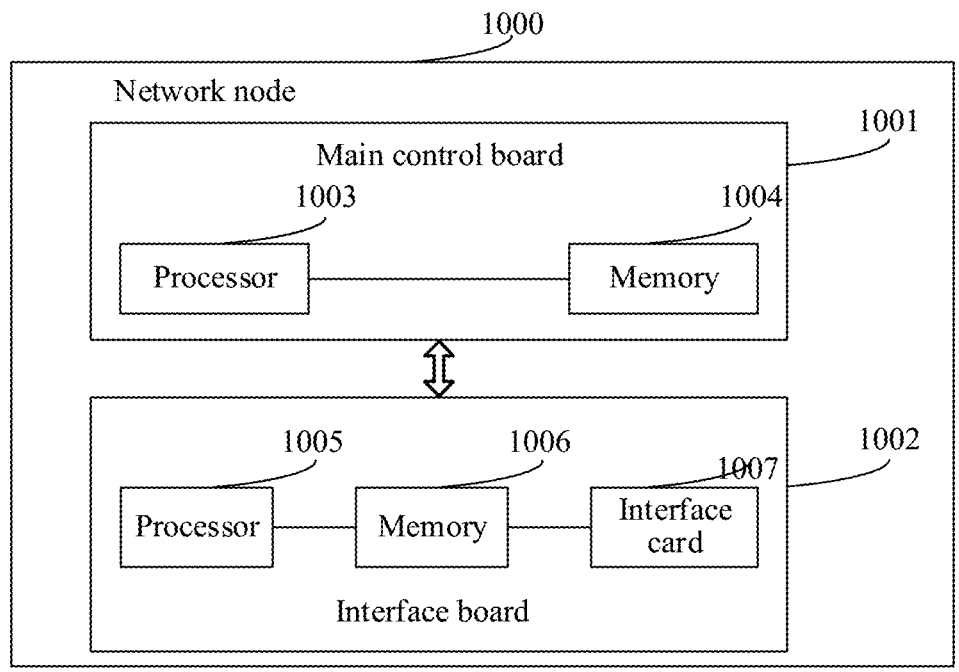
FIG. 10 is a schematic structural diagram of a network node according to an embodiment.

FIG. 10 is another possible schematic structural diagram of the first network node in the foregoing embodiments. The network node 1000 includes a main control board 1001 and an interface board 1002. The main control board 1001 includes a processor 1003 and a memory 1004. The interface board 1002 includes a processor 1005, a memory 1006, and an interface card 1007. The main control board 1001 and the interface board 1002 are coupled.

These hardware devices may implement corresponding functions of the first network node in the method example in FIG. 2 or FIG. 6. For example, the memory 1006 is configured to store program code of the interface board 1002, the processor 1005 is configured to invoke the program code in the memory 1006 to trigger the interface card 1007 to perform various information receiving and sending performed by the first network node in the foregoing method embodiments. The memory 1004 may be configured to store program code of the main control board 1001, and the processor 1003 is configured to invoke the program code in the memory 1004 to perform processing other than information receiving and sending performed by the first network node in the foregoing method embodiments. For example, the processor 1003 is configured to obtain a segment identifier of a second network node in a segment list of a first packet, and add a network performance parameter of the first network node 1000 to the segment list. The processor 1005 is configured to trigger the interface card 1007 to send, to the second network node, the first packet to which the network performance parameter of the network node 1000 is added. The memory 1004 is configured to store the program code and data of the main control board 1001, and the memory 1006 is configured to store the program code and data of the interface board 1002.

In a possible implementation, an IPC channel is established between the main control board 1001 and the interface board 1002, and communication is performed between the main control board 1001 and the interface board 1002 through the IPC channel. For example, the main control board 1001 sends a second packet to the interface board 1002 through the IPC channel.

The network node 1000 may be a router, a switch, or a network node having a forwarding function. The network node 1000 can implement the functions of the first network node in the foregoing method embodiments. For specific execution steps, refer to the foregoing method embodiments, and details are not described herein again.

Figure 11:
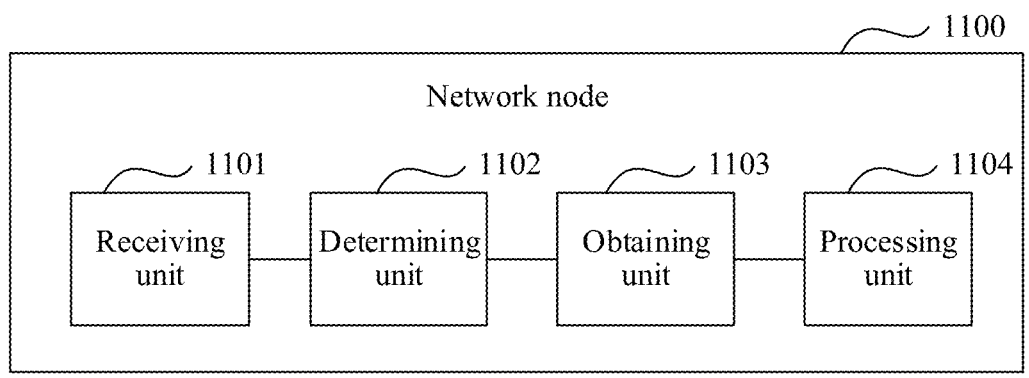
FIG. 11 is a schematic structural diagram of a network node according to an embodiment.

FIG. 11 is a possible schematic structural diagram of the second network node in the foregoing embodiments. The network node 1100 may implement functions of the second network node in the embodiment shown in FIG. 2 or FIG. 6. Referring to FIG. 11, the network node 1100 includes a receiving unit 1101, a determining unit 1102, an obtaining unit 1103, and a processing unit 1104. These units may perform the corresponding functions of the second network node in the foregoing method examples. For example, the receiving unit 1101 is configured to perform various information receiving performed by the second network node in the foregoing method embodiments. The determining unit 1102 is configured to perform various information determining performed by the second network node in the foregoing method embodiments. The obtaining unit 1103 is configured to perform various information obtaining performed by the second network node in the foregoing method embodiments. The processing unit 1104 is configured to perform processing other than information receiving and sending, information determining, and information obtaining that are performed by the second network node in the foregoing method embodiments. For example, the receiving unit 1101 is configured to receive a packet that is sent by a first network node and that includes a segment list, where a first segment identifier in the segment list includes a network performance parameter of the first network node. The determining unit 1102 is configured to determine that a DA of the packet matches a segment identifier of the second network node 1100. The obtaining unit 1103 is configured to obtain the network performance parameter of the first network node. The processing unit 1104 is configured to calculate network performance based on the network performance parameter of the first network node.

It should be noted that, in the embodiments, division into the units is merely an example, and is merely logical function division. In actual implementation, another division manner may be used. Functional units in the embodiments may be integrated into one unit, or each of the units may exist alone, or two or more units are integrated into one unit. For example, in the foregoing embodiments, the receiving unit and the sending unit may be a same unit or different units. The integrated unit may be implemented in a form of hardware, or may be implemented in a form of a software functional unit.

Figure 12:
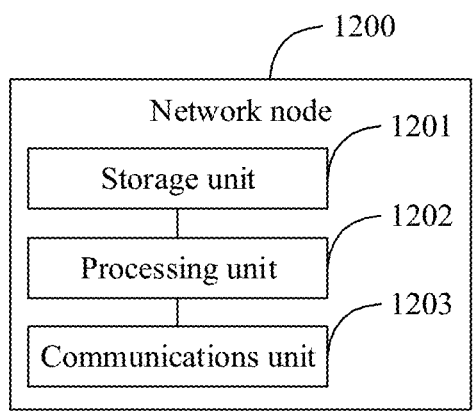
FIG. 12 is a schematic structural diagram of a network node according to an embodiment.

When an integrated unit is used, FIG. 12 is another possible schematic structural diagram of the second network node in the foregoing embodiments. The second network node 1200 may also implement the functions of the second network node in the embodiment in FIG. 2 or implement the functions of the network node 106 in the embodiment shown in FIG. 6.

The network node 1200 includes a storage unit 1201, a processing unit 1202, and a communications unit 1203. The processing unit 1202 is configured to control and manage an action of the network node 1200. For example, the processing unit 1202 is configured to support the network node 1200 in performing the process S205 in FIG. 2, the process S604 in FIG. 6, and/or another process of the technology described in this specification. The communications unit 1203 is configured to support the network node 1200 in communicating with another network entity, for example, communicating with the first network node in FIG. 2, or communicating with the network node 103 in FIG. 6. The storage unit 1201 is configured to store program code and data of the network node 1200.

The processing unit 1202 may be a processor, for example, a CPU, a general-purpose processor, a DSP, an ASIC, an FPGA, or another programmable logic device, a transistor logic device, a hardware component, or any combination thereof. The processing unit 1202 may implement or execute various example logical blocks, modules, and circuits described with reference to content disclosed in the embodiments. The processor may be a combination of processors implementing a computing function, for example, a combination of one or more microprocessors or a combination of the DSP and a microprocessor. The communications unit 1203 may be a transceiver, and the storage unit 1201 may be a memory.

Figure 13:
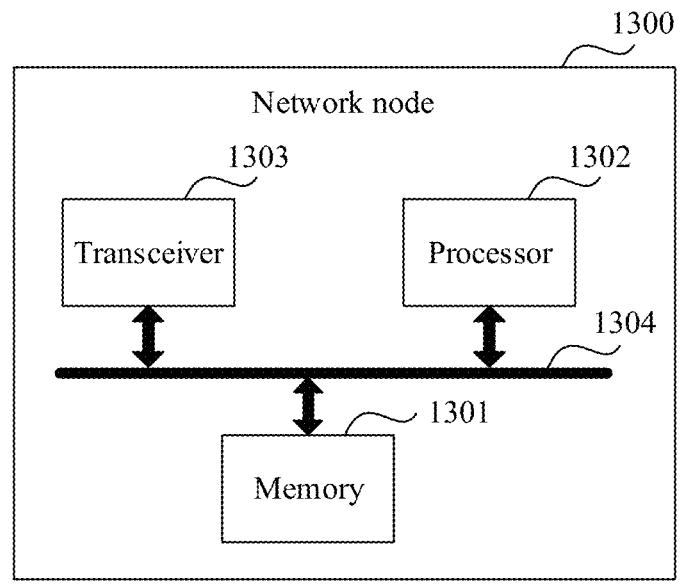
FIG. 13 is a schematic structural diagram of a network node according to an embodiment.

When the processing unit 1202 is the processor, the communications unit 1203 is the transceiver, and the storage unit 1201 is the memory, the second network node in this embodiment may be a network node 1300 shown in FIG. 13.

FIG. 13 is a possible schematic structural diagram of the second network node in the foregoing embodiments. The network node 1300 includes a processor 1302, a transceiver 1303, a memory 1301, and a bus 1304. The transceiver 1303, the processor 1302, and the memory 1301 are interconnected through the bus 1304. The bus 1304 may be a PCI bus, an EISA bus, or the like. The bus may be classified into an address bus, a data bus, a control bus, and the like. For ease of representation, only one thick line is used to represent the bus in FIG. 13, but this does not mean that there is only one bus or only one type of bus.

Figure 14:
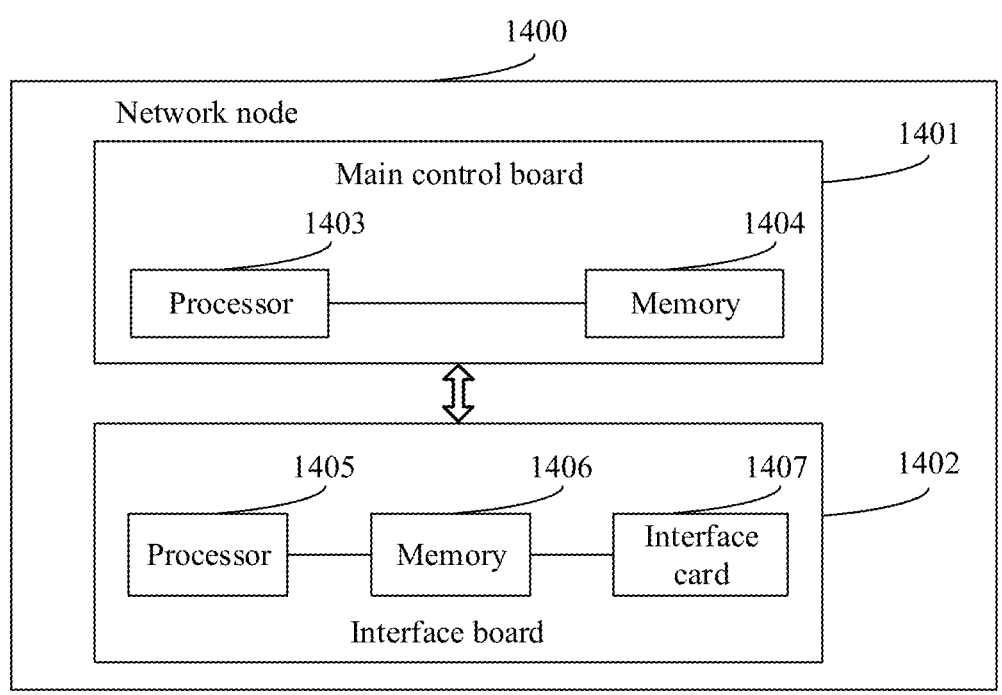
FIG. 14 is a schematic structural diagram of a network node according to an embodiment.

FIG. 14 is a possible schematic structural diagram of the second network node in the foregoing embodiments. The second network node 1400 includes a main control board 1401 and an interface board 1402. The main control board 1401 includes a processor 1403 and a memory 1404. The interface board 1402 includes a processor 1405, a memory 1406, and an interface card 1407. The main control board 1401 and the interface board 1402 are coupled.

These hardware devices may implement functions of the second network node in the embodiment shown in FIG. 2, or implement corresponding functions of the network node 106 in the embodiment shown in FIG. 6. For example, the memory 1406 may be configured to store program code of the interface board 1402, and the processor 1405 is configured to invoke the program code in the memory 1406 to trigger the interface card 1407 to perform various information receiving and sending performed by the second network node in the foregoing method embodiments. The memory 1404 may be configured to store program code of the main control board 1401, and the processor 1403 is configured to invoke the program code in the memory 1404 to perform processing other than information receiving and sending performed by the second network node in the foregoing method embodiments. For example, the interface card 1407 is configured to receive a packet that is sent by a first network node and that includes a segment list, where a first segment identifier in the segment list includes a network performance parameter of the first network node. The processor 1405 is configured to send the packet to the main control board 1401. The processor 1403 is configured to: determine that a DA of the packet matches a segment identifier of the second network node; obtain the network performance parameter of the first network node; and calculate network performance based on the network performance parameter of the first network node. The memory 1404 is configured to store the program code and data of the main control board 1401, and the memory 1406 is configured to store the program code and data of the interface board 1402.

In a possible implementation, an IPC channel is established between the main control board 1401 and the interface board 1402, and communication is performed between the main control board 1401 and the interface board 1402 through the IPC channel.

The network node 1400 may be a router, a switch, or a network node having a forwarding function. The network node 1400 can implement the functions of the corresponding network node in the foregoing method embodiments. For specific execution steps, refer to the foregoing method embodiments, and details are not described herein again.

Figure 15:
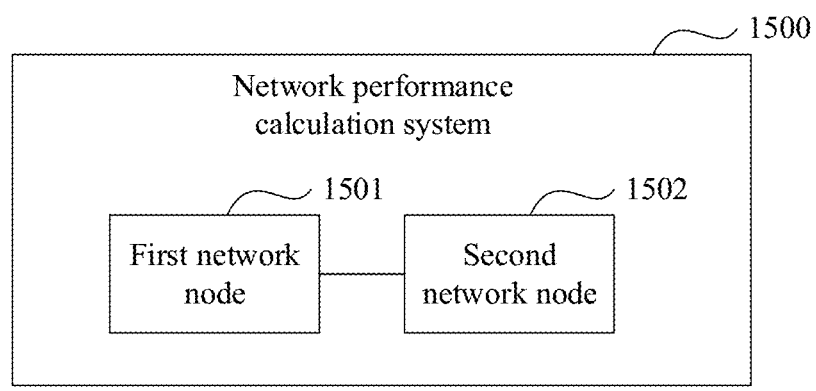
FIG. 15 is a schematic diagram of a network performance calculation system according to an embodiment.

Referring to FIG. 15, an embodiment provides another network performance calculation system 1500. The system 1500 is configured to implement the network performance calculation methods in the foregoing method embodiments. The system 1500 includes a first network node 1501 and a second network node 1502. The first network node 1501 and the second network node 1502 may respectively implement functions of the first network node and the second network node in the embodiment shown in FIG. 2, or implement functions of the network node 101 and the network node 106 in the embodiment shown in FIG. 6. For example, the first network node 1501 performs the processes S201, S202, and S203 in FIG. 2, the process S601 in FIG. 6, and/or another process performed by the first network node in the technology described in this specification. The second network node 1502 is configured to implement the processes S204, S205, and S206 in FIG. 2, and/or another process performed by the second network node in the technology described in this specification.

In an example, the system 1500 further includes a third network node, and the third network node is configured to implement the functions of the second network node in the embodiment shown in FIG. 2.

An embodiment further provides a non-volatile storage medium configured to store a software instruction used in the foregoing embodiments. The non-volatile storage medium includes a program used to perform the methods shown in the foregoing embodiments. When the program is executed on a computer or a network node, the computer or the network node is enabled to perform the methods in the foregoing method embodiments.

An embodiment further provides a computer program product including a computer program instruction. When the computer program product runs on a network node, the network node is enabled to perform the methods in the foregoing method embodiments.

"First" in the first network node in the embodiments is merely used as a name identifier, and does not represent a first place in sequence. For the words "second" and "third", this rule also applies.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected based on actual requirements to achieve the objectives of the solutions of the embodiments. In addition, in the accompanying drawings of the network node, connection relationships between modules indicate that the modules have communication connections with each other, which may be specifically implemented as one or more communications buses or signal cables.

Methods or algorithm steps described in combination with the content disclosed in the embodiments may be implemented by hardware, or may be implemented by a processor by executing a software instruction. The software instruction may include a corresponding software module. The software module may be stored in a random-access memory (RAM), a flash memory, a read-only memory (ROM), an erasable programmable ROM (EPROM), an electrically EPROM (EEPROM), a hard disk, a removable hard disk, a compact disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network node. Certainly, the processor and the storage medium may exist in the network node as discrete components.

A person skilled in the art should be aware that in the one or more examples, functions described in the disclosure may be implemented by hardware, software, firmware, or any combination thereof. When the function is implemented by software, these functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another place. The storage medium may be any available medium accessible to a general-purpose computer or a special-purpose computer.

In the foregoing specific implementations, the objectives, technical solutions, and benefits of the embodiments are further described in detail. It should be understood that the foregoing descriptions are merely specific implementations of the embodiments.

What is claimed is:

1. A method implemented by a first network node and comprising:
   obtaining a first packet comprising a segment routing header (SRH) including a segment list;
   adding a network performance parameter of the first network node to the segment list to create a modified first packet; and
   sending, to a second network node, the modified first packet, wherein the second network node is a next-hop segment node of the first network node on a forwarding path of the first packet, wherein a segment identifier comprises a network performance parameter type indicating the network performance parameter, wherein the network parameter type is a queue occupation type and a queue occupation rate of a packet sending queue is included in the segment list.

2. The method of claim 1, further comprising further adding the network performance parameter to a 65th bit to a 128th bit of the segment identifier.

3. The method of claim 1, further comprising further adding the network performance parameter to the segment identifier.

4. The method of claim 1, further comprising:
   receiving or generating a second packet comprising a destination address (DA);
   determining the segment list based on the DA and a packet forwarding policy, wherein the packet forwarding policy comprises a correspondence between the DA and the segment list; and
   adding the segment list to the second packet to generate the first packet.

5. The method of claim 1, wherein the method further comprises further obtaining the first network performance parameter based on the network performance parameter type.

6. The method of claim 1, wherein the network performance parameter comprises at least one of:
   a time at which the first network node sends the first packet; or
   a quantity of service packets that are sent using the segment list and that are received by the first network node before the first network node sends the first packet.

7. A method for network performance calculation, implemented by a second network node, and comprising:
   receiving, from a first network node, a packet comprising a segment routing header (SRH) including a segment list, wherein the segment list comprises a first segment identifier, and wherein the first segment identifier comprises a first network performance parameter of the first network node;
   making a determination that a destination address (DA) of the packet matches a second segment identifier of the second network node;
   obtaining, in response to the determination, the first network performance parameter; and
   calculating network performance based on the first network performance parameter, wherein a segment identifier comprises a network performance parameter type indicating the first network performance parameter, wherein the network parameter type is a queue occupation type and a queue occupation rate of a packet sending queue is included in the segment list.

8. The method of claim 7, wherein the method further comprises further obtaining the first network performance parameter based on the network performance parameter type.

9. The method of claim 7, wherein the first network performance parameter comprises a first time at which the first network node sends the packet to the second network node.

10. The method of claim 9, further comprising: determining a second time at which the second network node receives the packet; and determining a forwarding delay of sending the packet from the first network node to the second network node, wherein the forwarding delay is equal to a difference between the second time and the first time.

11. The method of claim 9, wherein a third segment identifier in the segment list comprises a second network performance parameter of a third network node, wherein the third network node is between the first network node and the second network node on a forwarding path of the packet, wherein the second network performance parameter comprises a third time at which the third network node sends the packet to the second network node, wherein the method further comprises determining a forwarding delay of forwarding the packet from the first network node to the third network node, and wherein the forwarding delay is equal to a difference between the third time and the first time.

12. The method of claim 7, wherein the first network performance parameter comprises a first quantity of first service packets that are sent using the segment list and that are received by the first network node before the first network node sends the packet.

13. The method of claim 12, further comprising:
determining a second quantity of second service packets that are sent using the segment list and that are received by the second network node before the second network node receives the packet; and
calculating, from among the second service packets, a third quantity of lost packets that are forwarded from the first network node to the second network node, wherein the third quantity is equal to a difference between the second quantity and the first quantity.

14. The method of claim 12, wherein a third segment identifier in the segment list comprises a second network performance parameter of a third network node, wherein the third network node is between the first network node and the second network node on a forwarding path of the packet, wherein the second network performance parameter comprises a third quantity of third service packets that are forwarded using the segment list and that are received when the third network node forwards the packet, wherein the method further comprises calculating, from among the third service packets, a fourth quantity of lost packets that are forwarded from the first network node to the third network node, and wherein the fourth quantity is equal to a difference between the third quantity and the first quantity.

15. A first network node comprising:
a memory configured to store instructions; and
a processor coupled to the memory and configured to execute the instructions to:
obtain a first packet comprising a segment routing header (SRH) including a segment list;
add a network performance parameter of the first network node to the segment list to create a modified first packet; and
send, to a second network node, the modified first packet, wherein the second network node is a next-hop segment node of the first network node on a forwarding path of the first packet, wherein a segment identifier comprises a network performance parameter type indicating the network performance parameter, wherein the network parameter type is a queue occupation type and a queue occupation rate of a packet sending queue is included in the segment list.

16. The network node of claim 15, wherein the processor is further configured to further add the network performance parameter to a 65th bit to a 128th bit of the segment identifier.

17. The network node of claim 15, wherein the processor is further configured to further add the network performance parameter to the segment identifier.

18. A second network node comprising:
a memory configured to store instructions; and
a processor coupled to the memory and configured to execute the instructions to:
receive, from a first network node, a packet comprising a segment routing header (SRH) including a segment list, wherein the segment list comprises a first segment identifier, and wherein the first segment identifier comprises a first network performance parameter of the first network node;
make a determination that a destination address (DA) of the packet matches a second segment identifier of the second network node;
obtain, in response to the determination, the first network performance parameter; and
calculate network performance based on the first network performance parameter, wherein a segment identifier comprises a network performance parameter type indicating the network performance parameter, wherein the network parameter type is a queue occupation type and a queue occupation rate of a packet sending queue is included in the segment list.

19. The network node of claim 18, wherein the processor is further configured to further obtain the first network performance parameter based on the network performance parameter type.

20. The network node of claim 18, wherein the first network performance parameter comprises a first time at which the first network node sends the packet to the second network node.

* * * * *